United States Patent
Topol et al.

(10) Patent No.: US 9,733,266 B2
(45) Date of Patent: *Aug. 15, 2017

(54) LOW NOISE COMPRESSOR AND TURBINE FOR GEARED TURBOFAN ENGINE

(71) Applicants: United Technologies Corporation, Farmington, CT (US); MTU Aero Engines AG, Munich (DE)

(72) Inventors: David A. Topol, West Hartford, CT (US); Bruce L. Morin, Longmeadow, CT (US); Detlef Korte, Karlsfeld (DE)

(73) Assignees: UNITED TECHNOLOGIES CORPORATION, Hartford, CT (US); MTU AERO ENGINES AG (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/270,027

(22) Filed: Sep. 20, 2016

(65) Prior Publication Data

US 2017/0191415 A1    Jul. 6, 2017

Related U.S. Application Data

(63) Continuation of application No. 15/014,363, filed on Feb. 3, 2016, which is a continuation of application
(Continued)

(51) Int. Cl.
*F02C 7/24* (2006.01)
*F02C 3/10* (2006.01)
(Continued)

(52) U.S. Cl.
CPC .................. *G01P 3/48* (2013.01); *F01D 5/02* (2013.01); *F01D 5/12* (2013.01); *F02C 3/10* (2013.01);
(Continued)

(58) Field of Classification Search
CPC ...... F01D 5/02; F01D 5/12; F02C 7/24; F02C 3/10; F02C 7/32; F02C 7/36; F02K 3/06;
(Continued)

(56) References Cited

U.S. PATENT DOCUMENTS 2,850,226 A    9/1958   Lundquist
2,957,655 A   10/1960   Knapp et al.
(Continued)

FOREIGN PATENT DOCUMENTS

CN    1453466 A   11/2003
CN    1952373 A    4/2007
(Continued)

OTHER PUBLICATIONS

Third Party Observations filed with EPO, Apr. 2, 2016.
(Continued)

*Primary Examiner* — Igor Kershteyn
(74) *Attorney, Agent, or Firm* — Carlson, Gaskey & Olds, P.C.

(57) ABSTRACT

A gas turbine engine has a fan, a turbine section having a first turbine including a first turbine rotor, a compressor rotor, and a gear reduction configured to effect a reduction in a speed of the fan relative to an input speed from the first turbine rotor. Each of the compressor rotor and the first turbine rotor includes a number of blades in each of a plurality of blade rows, the number of blades configured to operate at least some of the time at a rotational speed, and the number of blades and the rotational speed being such that the following formula holds true for at least a majority of the blade rows of the first turbine rotor, but does not hold true for any of the blade rows of the compressor rotor: (number of blades×rotational speed)/60≥5500, and the rotational speed being an approach speed in revolutions per minute.

20 Claims, 1 Drawing Sheet

Related U.S. Application Data

No. 14/967,478, filed on Dec. 14, 2015, now abandoned, which is a continuation-in-part of application No. 14/591,975, filed on Jan. 8, 2015, which is a continuation-in-part of application No. 14/144,710, filed on Dec. 31, 2013, now abandoned, which is a continuation of application No. 14/016,436, filed on Sep. 3, 2013, now Pat. No. 8,714,913, which is a continuation of application No. 13/630,276, filed on Sep. 28, 2012, now Pat. No. 8,632,301.

(51) Int. Cl.

| | |
|---|---|
| *G01P 3/48* | (2006.01) |
| *F02K 3/06* | (2006.01) |
| *F01D 5/12* | (2006.01) |
| *F01D 5/02* | (2006.01) |
| *F02C 7/32* | (2006.01) |

(52) U.S. Cl.
CPC .................. *F02C 7/24* (2013.01); *F02C 7/32* (2013.01); *F02K 3/06* (2013.01); *F05D 2220/32* (2013.01); *F05D 2220/36* (2013.01); *F05D 2260/40311* (2013.01); *F05D 2260/96* (2013.01)

(58) Field of Classification Search
CPC ............. F05D 2220/36; F05D 2220/32; F05D 2260/40311; F05D 2260/96; Y02T 50/673; Y10T 29/4932; Y10T 29/49236
See application file for complete search history.

(56) References Cited

U.S. PATENT DOCUMENTS

| | | | |
|---|---|---|---|
| 3,194,487 A | 7/1965 | Tyler et al. | |
| 3,270,953 A | 9/1966 | Jerie et al. | |
| 3,287,906 A | 11/1966 | McCormick | |
| 3,373,928 A | 3/1968 | Erwin et al. | |
| 3,618,699 A | 11/1971 | Evans et al. | |
| 3,747,343 A | 7/1973 | Rosen | |
| 3,754,484 A | 8/1973 | Roberts | |
| 3,892,358 A | 7/1975 | Gisslen | |
| 3,953,148 A | 4/1976 | Seippel et al. | |
| 3,973,865 A | 8/1976 | Mugele | |
| 4,130,872 A | 12/1978 | Haloff | |
| 4,131,387 A | 12/1978 | Kazin et al. | |
| 4,732,532 A | 3/1988 | Schwaller et al. | |
| 4,883,240 A | 11/1989 | Adamson et al. | |
| 4,968,216 A | 11/1990 | Anderson et al. | |
| 5,169,288 A | 12/1992 | Gliebe et al. | |
| 5,190,441 A | 3/1993 | Murphy et al. | |
| 5,197,855 A | 3/1993 | Magliozzi et al. | |
| 5,433,674 A | 7/1995 | Sheridan et al. | |
| 5,447,411 A | 9/1995 | Curley et al. | |
| 5,486,091 A | 1/1996 | Sharma | |
| 5,524,847 A | 6/1996 | Brodell et al. | |
| 5,778,659 A | 7/1998 | Duesler et al. | |
| 5,857,836 A | 1/1999 | Stickler et al. | |
| 5,915,917 A | 6/1999 | Eveker et al. | |
| 5,975,841 A | 11/1999 | Lindemuth et al. | |
| 6,036,438 A | 3/2000 | Imai | |
| 6,195,983 B1 | 3/2001 | Wadia et al. | |
| 6,223,616 B1 | 5/2001 | Sheridan | |
| 6,260,794 B1 | 7/2001 | Rowe | |
| 6,318,070 B1 | 11/2001 | Rey et al. | |
| 6,554,564 B1 | 4/2003 | Lord | |
| 6,732,502 B2 | 5/2004 | Seda et al. | |
| 6,814,541 B2 | 11/2004 | Evans et al. | |
| 7,021,042 B2 | 4/2006 | Law | |
| 7,108,485 B2 | 9/2006 | Wobben | |
| 7,526,913 B2 | 5/2009 | Orlando | |
| 7,591,754 B2 | 9/2009 | Duong et al. | |
| 7,694,505 B2 | 4/2010 | Schilling | |
| 7,806,651 B2 | 10/2010 | Kennepohl et al. | |
| 7,824,305 B2 | 11/2010 | Duong et al. | |
| 7,926,260 B2 | 4/2011 | Sheridan et al. | |
| 7,976,283 B2 | 7/2011 | Huck | |
| 7,984,607 B2 | 7/2011 | Sharma et al. | |
| 8,205,432 B2 | 6/2012 | Sheridan | |
| 8,246,292 B1 | 8/2012 | Morin et al. | |
| 8,834,099 B1 | 9/2014 | Topol et al. | |
| 9,140,127 B2 * | 9/2015 | Gallagher | F01D 5/141 |
| 9,163,517 B2 * | 10/2015 | Gallagher | F01D 5/141 |
| 9,347,323 B2 * | 5/2016 | Gallagher | F02C 3/04 |
| 2002/0096598 A1 | 7/2002 | Nelson | |
| 2003/0163983 A1 | 9/2003 | Seda et al. | |
| 2004/0128978 A1 | 7/2004 | McCune et al. | |
| 2005/0017876 A1 | 1/2005 | Ziarno | |
| 2006/0117756 A1 | 6/2006 | Wakeman et al. | |
| 2008/0022691 A1 | 1/2008 | Kennepohl | |
| 2008/0098716 A1 | 5/2008 | Orlando et al. | |
| 2008/0190095 A1 | 8/2008 | Baran | |
| 2008/0317588 A1 | 12/2008 | Grabowski et al. | |
| 2009/0191047 A1 | 7/2009 | Schlinker et al. | |
| 2009/0260345 A1 | 10/2009 | Chaudhry | |
| 2009/0301055 A1 | 12/2009 | Kallappa | |
| 2010/0148396 A1 | 6/2010 | Xie et al. | |
| 2010/0192595 A1 | 8/2010 | Orlando | |
| 2010/0331139 A1 | 12/2010 | McCune | |
| 2011/0056208 A1 | 3/2011 | Norris et al. | |
| 2011/0159797 A1 | 6/2011 | Beltman et al. | |
| 2011/0219741 A1 | 9/2011 | Ernst et al. | |
| 2013/0186058 A1 | 7/2013 | Sheridan et al. | |
| 2013/0195610 A1 | 8/2013 | Rose et al. | |
| 2013/0202403 A1 | 8/2013 | Morin et al. | |
| 2013/0276424 A1 | 10/2013 | Topol et al. | |
| 2014/0003915 A1 | 1/2014 | Topol et al. | |

FOREIGN PATENT DOCUMENTS

| | | | |
|---|---|---|---|
| DE | 102010023703 A1 | 12/2011 | |
| EP | 2157305 | 2/2010 | |
| FR | 2260701 A1 | 9/1975 | |
| GB | 1386481 A | 3/1975 | |
| GB | 1516041 | 6/1978 | |
| GB | 2041090 | 9/1980 | |
| JP | 2003286857 A | 10/2003 | |
| JP | 2004526619 A | 9/2004 | |
| JP | 2006161809 A | 6/2006 | |
| JP | 2007113579 A | 5/2007 | |
| JP | 2008115856 A | 5/2008 | |
| JP | 2008115858 A | 5/2008 | |
| JP | 2008196489 A | 8/2008 | |
| JP | 2009002329 A | 1/2009 | |
| JP | 2010209916 A | 9/2010 | |
| WO | 0019082 A2 | 4/2000 | |
| WO | 2007038674 | 4/2007 | |
| WO | 2013122713 A2 | 8/2013 | |

OTHER PUBLICATIONS

"The Geared Turbofan Technology—Opportunities, Challenges and Readiness Status" by C. Riegler and C. Bichlmaier, MTU Aero Engines. In: 1st council of European Aerospace Societies (CEAS) European Air and Space Conference CEAS-2007-054 (2007).

Third Party Observations filed Dec. 3, 2015.

Third Party Observations filed Mar. 9, 2015 for EP13749721.0.

Aero-Engine Design: From State of the Art Turbofans Towards Innovative Architectures; published in Mar. 3-7, 2008 by von Karman Institute for fluid dynamics.

Gears Put a New Spin on Turbofan Performance, published on Nov. 5, 1998.

Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida.

(56) References Cited

OTHER PUBLICATIONS

Agarwal, B.D and Broutman, L.J. (1990). Analysis and performance of fiber composites, 2nd Edition. John Wiley & Sons, Inc. New York: New York.
Brines, G.L. (1990). The turbofan of tomorrow. Mechanical Engineering: The Journal of the American Society of Mechanical Engineers,108(8), 65-67.
Faghri, A. (1995). Heat pipe and science technology. Washington, D.C.: Taylor & Francis.
Hess, C. (1998). Pratt & Whitney develops geared turbofan. Flug Revue 43(7). Oct. 1998.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Griffiths, B. (2005). Composite fan blade containment case. Modern Machine Shop. Retrieved from: http://www.mmsonline.com/articles/composite-fan-blade-containment-case.
Hall, C.A. and Crichton, D. (2007). Engine design studies for a silent aircraft. Journal of Turbomachinery, 129, 479-487.
Hague, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.
Brennan, P.J. and Kroliczek, E.J. (1979). Heat pipe design handbook. Prepared for National Aeronautics and Space Administration by B & K Engineering, Inc. Jun. 1979.
Horikoshi, S. and Serpone, N. (2013). Introduction to nanoparticles. Microwaves in nanoparticle synthesis. Wiley-VCH Verlag GmbH & Co. KGaA.
Kerrebrock, J.L. (1977). Aircraft engines and gas turbines. Cambridge, MA: The MIT Press.
Xie, M. (2008). Intelligent engine systems: Smart case system. NASA/CR-2008-215233.
Knip, Jr., G. (1987). Analysis of an advanced technology subsonic turbofan incorporating revolutionary materials. NASA Technical Memorandum. May 1987.
Willis, W.S. (1979). Quiet clean short-haul experimental engine (QCSEE) final report. NASA/CR-159473.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press.
Ramsden, J.M. (Ed). (1978). The new European airliner. Flight International, 113(3590). Jan. 7, 1978.
Langston, L. and Faghri, A. Heat pipe turbine vane cooling. Prepared for Advanced Turbine Systems Annual Program Review. Morgantown, West Virginia. Oct. 17-19, 1995.
Oates, G.C. (Ed). (1989). Aircraft propulsion systems and technology and design. Washington, D.C.: American Institute of Aeronautics, Inc.
Lau, K., Gu, C., and Hui, D. (2005). A critical review on nanotube and nanotube/nanoclay related polymer composite materials. Composites: Part B 37(2006) 425-436.
Shorter Oxford English dictionary, 6th Edition. (2007). vol. 2, N-Z. p. 1888.
Lynwander, P. (1983). Gear drive systems: Design and application. New York, New York: Marcel Dekker, Inc.
Sweetman, B. and Sutton, O. (1998). Pratt & Whitney's surprise leap. Interavia Business & Technology, 53.621, p. 25.
Mattingly, J.D. (1996). Elements of gas turbine propulsion. New York, New York: McGraw-Hill, Inc.
Ratna, D. (2009). Handbook of thermoset resins. Shawbury, UK: iSmithers.
Wendus, B.E., Stark, D.F., Holler, R.P., and Funkhouser, M.E. (2003). Follow-on technology requirement study for advanced subsonic transport. NASA/CR-2003-212467.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.
Merriam-Webster's collegiate dictionary, 11th Ed. (2009). p. 824.
Merriam-Webster's collegiate dictionary, 10th Ed. (2001). p. 1125-1126.
Whitaker, R. (1982). ALF 502: plugging the turbofan gap. Flight International, p. 237-241, Jan. 30, 1982.
Hughes, C. (2010). Geared turbofan technology. NASA Environmentally Responsible Aviation Project. Green Aviation Summit. NASA Ames Research Center. Sep. 8-9, 2010.
File History for U.S. Appl. No. 12/131,876.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983.
Dickey, T.A. and Dobak, E.R. (1972). The evolution and development status of ALF 502 turbofan engine. National Aerospace Engineering and Manufacturing Meeting. San Diego, California. Oct. 2-5, 1972.
Gunston, B. (Ed.) (2000). Jane's aero-engines, Issue seven. Coulsdon, Surrey, UK: Jane's Information Group Limited.
Ivchenko-Progress D-436. Jane's Aero-engines, Aero-engines—Turbofan. Feb. 8, 2012.
Ivchenko-Progress AI-727M. Jane's Aero-engines, Aero-engines—Turbofan. Nov. 27, 2011.
Ivchenko-Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Honeywell LF502. Jane's Aero-engines, Aero-engines—Turbofan. Feb. 9, 2012.
Honeywell LF507. Jane's Aero-engines, Aero-engines—Turbofan. Feb. 9, 2012.
Honeywell TFE731. Jane's Aero-engines, Aero-engines—Turbofan. Jul. 18, 2012.
NASA Conference Publication. Quiet, powered-lift propulsion. Cleveland, Ohio. Nov. 14-15, 1978.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8), p. 32.
Hendricks, E.S. and Tong, M.T. (2012). Performance and weight estimates for an advanced open rotor engine. NASA/TM-2012-217710.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883.
Zalud, T. (1998). Gears put a new spin on turbofan performance. Machine Design, 70(20), p. 104.
Gunston (2000). Jane's Aero-Engines, Issue Seven, pp. 510-512, Mar. 2000.
Denós R. et al.: "Geared Fan", Mar. 3, 2008, Aero-Engine Design: From State-Of-The-Art Turbofans Towards Innovative Architectures—Hardcover. Lectures Series.
Sasada, Eishiro, Kokuki Engine No Soon Teigen Gijutsu Saizensen, Aviation Environment Research, Japan, Airport Environment Improvement Foundation, Aviation Environment Research Center, Mar. 31, 2010, No. 14, 8-14.
European Search Report for European Application No. 13749721.0 mailed Aug. 17, 2015.
C Riegler et al.: "The Geared Turbofan Technology—Opportunities, Challenges and Readiness Status", Proceedings CEAS 2007, Sep. 11, 2007.
IPR—Declaration of Dr. Magdy Attia, Apr. 5, 2016.

(56) References Cited

OTHER PUBLICATIONS

Dr. Günter Wilfert, MTU Aero Engines, Geared Fan, Lecture Series Mar. 2008, Aero-Engine Design: From State of the Art Turbofans Towards Innovative Architectures (2008).
J. Kurzke, Fundamental Differences Between Conventional and Geared Turbofans, Proceedings of ASME Turbo Expo 2009 (2009) (excerpts).
Turbofan and Turbojet Engines, Database Handbook, Roux, 2007.
Michael Norton and Denis Karczub, Fundamentals of Noise and Vibration Analysis for Engineers (2003) (excerpts).
Gerald L. Brines, Pratt & Whitney, The Turbofan of Tomorrow, 112 Mechanical Engineering 8 (1990).
Elements of Gas Turbine Propulsion, Jack D. Mattingly, 1996.
Richard Whitaker, ALF502: plugging the turbofan gap, Flight International (1982).
Petition for Inter Parties Review of U.S. Pat. No. 8,246,292, Apr. 8, 2016.
Third Party Observations, filed with EPO Dec. 3, 2015.
D. Crichton, et al., "Design and operation for ultra low noise take-off," American Institute of Aeronautics and Astronautics, Jan. 8-11, 2007.
F. J. Malzacher, et al., "Aerodesign and Testing of an Aeromechanically Highly Loaded LP Turbine," Journal of Turbomachinery, Oct. 2006, vol. 128, pp. 643-649.
Wilfert, et al., "CLEAN—Validation of a High Efficient Low NOx core, a GTF High Speed Turbine and an Integration of a Recuperator in an Environmental Friendly Engine Concept," American Institute of Aeronautics and Astronautics, Jul. 10-13, 2005, pp. 1-11.
Wlfert, et al., "CLEAN—Validation of a GTF High Speed Turbine and Integration of Heat Exchanger Technology in an Environmentally Friendly Engine Concept," International Society on Air Breathing Engines, Feb. 2005.
Kurzke, Joachim, "Performance Modeling Methodology: Efficiency Definitions for Cooled Single and Multistage Turbines," American Society of Mechanical Engineers, Jun. 2-6, 2002, pp. 1-8.
Halliwell, Ian, "Preliminary Engine Design—A Practical Overview," American Institute of Aeronautics and Astronautics, Jul. 13-15, 1998, pp. 1-7.
J.M. Stricker, "The Gas Turbine Engine Conceptual Design Process—An Integrated Approach," RTO, May 11-15, 1998.
J. M. Stricker, et al., "Computerized Preliminary Design of Turbomachinery," American Society of Mechanical Engineers, Jun. 3-6, 1991, pp. 1-7.
Glassman, Arthur J., "Users Manual for Updated Computer Code for Axial-Flow Compressor Conceptual Design," NASA, Jul. 1992.
R.A. Wall, "Axial Flow Compressor Performance Prediction," Rolls-Royce, 1971.
M.G. Philpot, "Practical Considerations in Designing the Engine Cycle," Defence Research Agency, 1992.
Stewart, Warner L., "A Study of Axial-Flow Turbine Efficiency Characteristics in Terms of Velocity Diagram Parameters," American Society of Mechanical Engineers, 1962.
Glassman, Arthur J., "Turbine Design and Application," NASA, vol. One, 1972.
S. F. Smith, "A Simple Correlation of Turbine Efficiency," Journal of the Royal Aeronautical Society, vol. 69, Jul. 1965.
J. Kurzke, "Calculation of Installation Effects Within Performance Computer Programs," Advisory Group for Aerospace Research and Development, May 1992.
P. Jeschke, et al., "Preliminary Gas Turbine Design Using the Multidisciplinary Design System MOPEDS," American Society of Mechanical Engineers, Apr. 2004, vol. 126, pp. 258-264.
EP Office Action for EP Application No. 13769027.7 mailed Jan. 9, 2015.
EP Office Action for EP Application No. 13769027.7 mailed Jun. 19, 2015.
EP Office Action for EP Application No. 13749721.0 mailed Sep. 11, 2015.
Third Party Opposition to Counterpart EP Application No. 13769027.7 received Apr. 2, 2015.
J. S. Sabnis, 2005, Emissions and Noise—Next Frontier for Aircraft Engine Technologies, presented at the AIAA/AAAF Aircraft Noise and Emissions Reduction Symposium, Monterey, California, USA.
Reshotko, Meyer et al. "Core noise measurements on a YF-102 turbofan engine," NASA Technical Memorandum X-73587, Jan. 24, 1977.
European Search Report for European Application No. 16150538.3 mailed Jun. 1, 2016.
Decision Denying Institution of Inter Pules Review. *General Electric Company*, Petitioner, v. *United Technologies Corporation*, Patent Owner. Entered Sep. 29, 2016. (IPR 2016-00857).
Petition for Inter Partes Review of U.S. Pat. No. 8,517,668. *General Electric Company*, Petitioner, v. *United Technologies Corporation*, Patent Owner. Filed Dec. 14, 2016.
Declaration of Dr. Magdy Attia. In re U.S. Appl. No. 8,517,668. Executed Dec. 8, 2016. pp. 1-81.
U.S. Department of Transportation: Federal Aviation Administration Advisory Circular. Runway overrun prevention. Dated: Nov. 6, 2007. p. 1-8 and Appendices.
U.S. Department of Transportation: Federal Aviation Administration Advisory Circular. Standard operating procedures for flight deck crewmembers. Dated: Feb. 27, 2013. p. 1-6 and Appendices.
Cramoisi, G. Ed. (2012). Death in the Potomac: The crash of Air Florida Flight 90. Air Crash Investigations. Accident Report NTSB/AAR-82-8. p. 45-47.
Daly, M. Ed. (2010). Jane's Aero-Engine. Issue Twenty-seven. Mar. 2010. p. 633-636.
Clark, Bruce J. et al., "Measured and Predicted Noise of the AVCO-Lycoming YF-102 Turbofan Noise," NASA Technical Memorandum 79069, Mar. 14, 1979, pp. 1-18, Cleveland, Ohio.
Partial European Search Report for European Application No. 16178720.5 dated Feb. 20, 2017.
European Search Report for European Application No. 16195177.7 dated Feb. 14, 2017.

\* cited by examiner

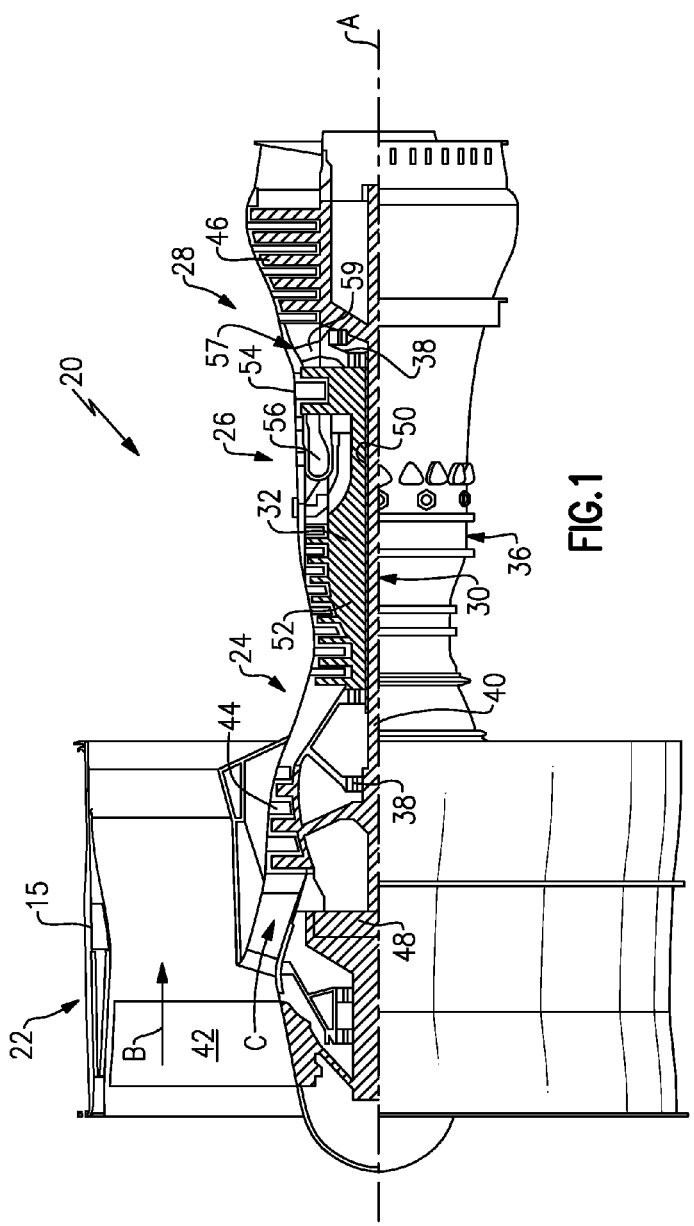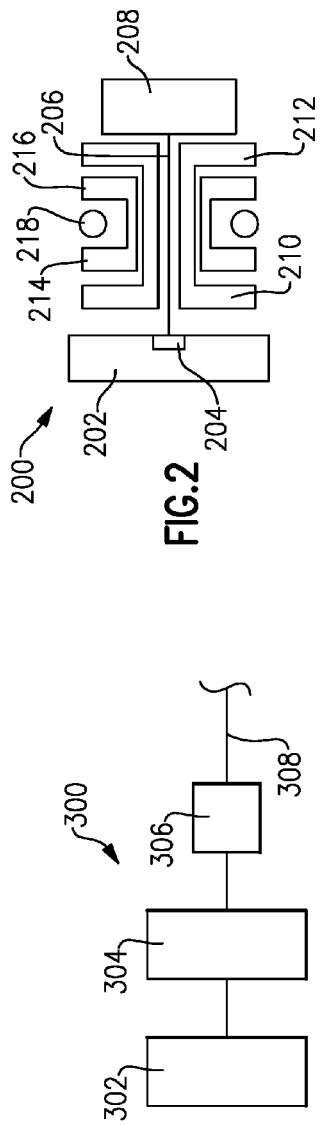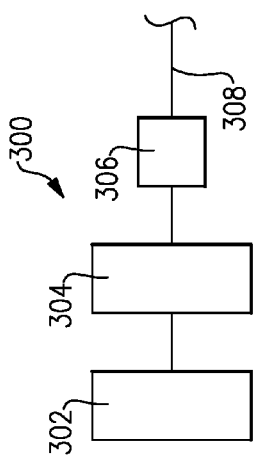

LOW NOISE COMPRESSOR AND TURBINE FOR GEARED TURBOFAN ENGINE

CROSS-REFERENCE TO RELATED APPLICATION

This application is a continuation of U.S. patent application Ser. No. 15/014,363, filed Feb. 3, 2016, which is a continuation of U.S. patent application Ser. No. 14/967,478, filed Dec. 14, 2015, which is a continuation-in-part of U.S. patent application Ser. No. 14/591,975, filed Jan. 8, 2015, which is a continuation-in-part of U.S. patent application Ser. No. 14/144,710, filed Dec. 31, 2013, which is a continuation of U.S. patent application Ser. No. 14/016,436, filed Sep. 3, 2013, now U.S. Pat. No. 8,714,913, issued May 6, 2014, which is a continuation of U.S. patent application Ser. No. 13/630,276, filed Sep. 28, 2012, now U.S. Pat. No. 8,632,301, issued Jan. 21, 2014.

BACKGROUND

This application relates to the design of a gas turbine engine rotor which can be operated to produce noise that is less sensitive to human hearing.

Gas turbine engines are known, and typically include a fan delivering air into a compressor. The air is compressed in the compressor and delivered downstream into a combustor section where it was mixed with fuel and ignited. Products of this combustion pass downstream over turbine rotors, driving the turbine rotors to rotate.

Typically, there is a high pressure turbine rotor, and a low pressure turbine rotor. Each of the turbine rotors include a number of rows of turbine blades which rotate with the rotor. Interspersed between the rows of turbine blades are vanes.

The high pressure turbine rotor has typically driven a high pressure compressor rotor, and the low pressure turbine rotor has typically driven a low pressure compressor rotor. Each of the compressor rotors also include a number of compressor blades which rotate with the rotors. There are also vanes interspersed between the rows of compressor blades.

The low pressure turbine or compressor can be a significant noise source, as noise is produced by fluid dynamic interaction between the blade rows and the vane rows. These interactions produce tones at a blade passage frequency of each of the low pressure turbine rotors, the low pressure compressor rotors, and their harmonics.

The noise can often be in a frequency range that is very sensitive to humans. To mitigate this problem, in the past, a vane-to-blade ratio has been controlled to be above a certain number. As an example, a vane-to-blade ratio may be selected to be 1.5 or greater, to prevent a fundamental blade passage tone from propagating to the far field. This is known as "cut-off."

However, acoustically cut-off designs may come at the expense of increased weight and reduced aerodynamic efficiency. Stated another way, by limiting the designer to a particular vane to blade ratio, the designer may be restricted from selecting such a ratio based upon other characteristics of the intended engine.

Historically, the low pressure turbine has driven both a low pressure compressor section and a fan section. More recently, a gear reduction has been provided such that the fan and low pressure compressor can be driven at distinct speeds.

SUMMARY

In a featured embodiment, a gas turbine engine has a fan, a compressor section having a low pressure portion and a high pressure portion, a combustor section, and a turbine having a first turbine rotor. The first turbine rotor drives the fan. A gear reduction effects a reduction in the speed of the fan relative to a speed of the first turbine rotor. Each of the compressor rotor and the first turbine rotor includes a number of blades in each of a plurality of rows. The blades operate at least some of the time at a rotational speed. The number of blades and the rotational speed are such that the following formula holds true for at least one of the blade rows of the first turbine rotor and/or the compressor rotor: (number of blades×rotational speed)/60≥5500. The rotational speed is an approach speed in revolutions per minute.

These and other features of this application will be best understood from the following specification and drawings, the following of which is a brief description.

BRIEF DESCRIPTION OF THE DRAWINGS

FIG. 1 shows a gas turbine engine.
FIG. 2 shows another embodiment.
FIG. 3 shows yet another embodiment.

DETAILED DESCRIPTION

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown), or an intermediate spool, among other systems or features. The fan section 22 drives air along a bypass flowpath B in a bypass duct defined within a nacelle 15, while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The terms "low" and "high" as applied to speed or pressure for the spools, compressors and turbines are of course relative to each other. That is, the low speed spool operates at a lower speed than the high speed spool, and the low pressure sections operate at lower pressure than the high pressures sections.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. In some embodiments, the bypass ratio is less than about thirty (30), or more narrowly less than about twenty (20). In embodiments, the gear reduction ratio is less than about 5.0, or less than about 4.0. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tambient } ° R)/(518.7)° R]^{0.5}$. The "Low corrected fan tip speed" as disclosed herein according to one non-limiting embodiment is less than about 1150 ft/second.

The use of the gear reduction between the low speed spool and the fan allows an increase of speed to the low pressure compressor. In the past, the speed of the low pressure turbine and compressor has been somewhat limited in that the fan speed cannot be unduly large. The maximum fan speed is at its outer tip, and in larger engines, the fan diameter is much larger than it may be in smaller power engines. However, the use of the gear reduction has freed the designer from limitation on the low pressure turbine and compressor speeds caused by a desire to not have unduly high fan speeds.

It has been discovered that a careful design between the number of rotating blades, and the rotational speed of the low pressure turbine can be selected to result in noise frequencies that are less sensitive to human hearing. The same is true for the low pressure compressor 44.

A formula has been developed as follows:

$$(\text{blade count} \times \text{rotational speed})/60 \text{ sec} \geq 5500 \text{ Hz}.$$

That is, the number of rotating blades in any low pressure turbine stage, multiplied by the rotational speed of the low pressure turbine 46 (in revolutions per minute), divided by 60 sec should be greater than or equal to about 5500 Hz. The same holds true for the low pressure compressor stages. More narrowly, the amounts should be greater than or equal to about 6000 Hz. In embodiments, the amount is less than or equal to about 10000 Hz, or more narrowly less than or equal to about 7000 Hz. A worker of ordinary skill in the art would recognize that the 60 sec factor is to change revolutions per minute to Hertz, or revolutions per one second. For the purposes of this disclosure, the term "about" means ±3% of the respective quantity unless otherwise disclosed.

The operational speed of the low pressure turbine 46 and low pressure compressor 44 as utilized in the formula should correspond to the engine operating conditions at each noise certification point defined in Part 36 or the Federal Airworthiness Regulations. More particularly, the rotational speed may be taken as an approach certification point as defined in Part 36 of the Federal Airworthiness Regulations. For purposes of this application and its claims, the term "approach speed" equates to this certification point. In other embodiments, the rotational speed is taken as a takeoff or cruise certification point, with the terms "takeoff speed" and "cruise speed" equating to these certification points. In some embodiments, the above formula results in a number that is less than or equal to about 10000 Hz at takeoff speed. In other embodiments, the above formula results in a number that is less than or equal to about 7000 Hz at approach speed.

It is envisioned that all of the rows in the low pressure turbine 46 meet the above formula. However, this application may also extend to low pressure turbines wherein the majority of the blade rows, or at least half of the blade rows, in the low pressure turbine meet the above formula, but perhaps some may not. By implication at least one, or less than half, of the rows meet the formula. The same is true for low pressure compressors, wherein all of the rows in the low pressure compressor 44 would meet the above formula. However, the application may extend to low pressure compressors wherein only the majority of the blade rows, or at least half of the blade rows, in the low pressure compressor meet the above formula, but some perhaps may not. Of course, by implication the formula may be true for at least some of the turbine rows but no compressor rows. In some cases, only one row of the low pressure turbine and/or low pressure compressor may meet the formula. Also, the formula may apply to at least some compressor rows, but no row in the turbine meets the formula.

This will result in operational noise that would be less sensitive to human hearing.

In embodiments, it may be that the formula can result in a range of greater than or equal to 5500 Hz, and moving higher. Thus, by carefully designing the number of blades and controlling the operational speed of the low pressure turbine 46 (and a worker of ordinary skill in the art would recognize how to control this speed) one can assure that the noise frequencies produced by the low pressure turbine are of less concern to humans.

The same holds true for designing the number of blades and controlling the speed of the low pressure compressor 44. Again, a worker of ordinary skill in the art would recognize how to control the speed.

In embodiments, it may be only the low pressure turbine rotor 46, or the low pressure compressor rotor 44 which is designed to meet the meet the above formula. On the other hand, it is also possible to ensure that both the low pressure turbine 46 and low pressure compressor 44 meet the above formula.

This invention is most applicable to jet engines rated to produce 15,000 pounds of thrust or more. In this thrust range, prior art jet engines have typically had frequency ranges of about 4000 hertz. Thus, the noise problems as mentioned above have existed.

Lower thrust engines (<15,000 pounds) may have operated under conditions that sometimes passed above the 4000 Hz number, and even approached 6000 Hz, however, this has not been in combination with the geared architecture, nor in the higher powered engines which have the larger fans, and thus the greater limitations on low pressure turbine or low pressure compressor speed.

FIG. 2 shows an embodiment 200, wherein there is a fan drive turbine 208 driving a shaft 206 to in turn drive a fan rotor 202. A gear reduction 204 may be positioned between the fan drive turbine 208 and the fan rotor 202. This gear reduction 204 may be structured and operate like the gear reduction disclosed above. A compressor rotor 210 is driven by an intermediate pressure turbine 212, and a second stage compressor rotor 214 is driven by a turbine rotor 216. A combustion section 218 is positioned intermediate the compressor rotor 214 and the turbine section 216.

FIG. 3 shows yet another embodiment 300 wherein a fan rotor 302 and a first stage compressor 304 rotate at a common speed. The gear reduction 306 (which may be structured as disclosed above) is intermediate the compressor rotor 304 and a shaft 308 which is driven by a low pressure turbine section.

The FIGS. 2 and 3 engines may be utilized with the speed and blade features disclosed above.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
   a fan;
   a turbine section having a first turbine including a first turbine rotor;
   a compressor rotor;
   a gear reduction configured to effect a reduction in a speed of the fan relative to an input speed from the first turbine rotor; and
   wherein each of the compressor rotor and the first turbine rotor includes a number of blades in each of a plurality of blade rows, the number of blades configured to operate at least some of the time at a rotational speed, and the number of blades and the rotational speed being such that the following formula holds true for at least a majority of the blade rows of the first turbine rotor, but does not hold true for any of the blade rows of the compressor rotor:

(number of blades×rotational speed)/60≥5500, and the rotational speed being an approach speed in revolutions per minute.

2. The gas turbine engine as set forth in claim 1, wherein the formula results in a number less than or equal to about 10000 for at least one of the blade rows of the first turbine rotor.

3. The gas turbine engine as set forth in claim 2, wherein the formula results in a number greater than 6000 for at least one of the blade rows of the first turbine rotor.

4. The gas turbine engine as set forth in claim 1, wherein the formula results in a number less than or equal to about 7000 Hz for at least one of the blade rows of the first turbine rotor.

5. The gas turbine engine as set forth in claim 1, further comprising a low fan pressure ratio less than 1.45, wherein the low fan pressure ratio is measured across a fan blade alone, and wherein the first turbine includes a pressure ratio greater than about 5:1, the first turbine including an inlet having an inlet pressure, and an outlet that is prior to any exhaust nozzle and having an outlet pressure, and the pressure ratio of the first turbine being a ratio of the inlet pressure to the outlet pressure.

6. The gas turbine engine as set forth in claim 5, further comprising a second turbine, wherein the second turbine has two stages, and wherein the gear reduction has a gear reduction ratio of greater than about 2.5:1.

7. The gas turbine engine as set forth in claim 6, wherein the gas turbine engine is rated to produce 15,000 pounds of thrust or more, and wherein the fan has a fan tip speed less than about 1150 ft/second.

8. A gas turbine engine comprising:
   a fan;
   a turbine section including a first turbine having a first turbine rotor;
   a compressor rotor;
   a gear reduction configured to effect a reduction in a speed of the fan relative to an input speed from the first turbine rotor; and
   wherein each of the compressor rotor and the first turbine rotor includes a number of blades in each of a plurality of blade rows, the number of blades configured to operate at least some of the time at a rotational speed, and the number of blades and the rotational speed being such that the following formula holds true for at least one of the blade rows of the first turbine rotor, and at least one of the blade rows of the compressor rotor:

(number of blades×rotational speed)/60≥5500, and the rotational speed being an approach speed in revolutions per minute, and the engine is rated to produce 15,000 pounds of thrust or more.

9. The gas turbine engine as set forth in claim 8, wherein the formula holds true for less than half of the blade rows of the compressor rotor.

10. The gas turbine engine as set forth in claim 8, wherein the formula holds true for only one of the blade rows of the compressor rotor.

11. The gas turbine engine as set forth in claim 8, wherein the formula holds true for all of the blade rows of the first turbine rotor.

12. The gas turbine engine as set forth in claim 8, wherein the formula results in a number less than or equal to about 7000 for at least one of the blade rows of at least one of the first turbine rotor and the compressor rotor.

13. The gas turbine engine as set forth in claim 8, further comprising a low fan pressure ratio less than 1.45, wherein the low fan pressure ratio is measured across a fan blade alone, and wherein the first turbine includes a pressure ratio greater than about 5:1, the first turbine including an inlet having an inlet pressure, and an outlet that is prior to any exhaust nozzle and having an outlet pressure, and the pressure ratio of the first turbine being a ratio of the inlet pressure to the outlet pressure.

14. The gas turbine engine as set forth in claim 13, further comprising a second turbine, wherein the second turbine has two stages, and wherein the gear reduction has a gear reduction ratio of greater than about 2.5:1.

15. A gas turbine engine comprising:
a fan;
a turbine section including a first turbine having a first turbine rotor;
a compressor rotor;
a gear reduction configured to effect a reduction in a speed of the fan relative to an input speed from the first turbine rotor; and
wherein each of the compressor rotor and the first turbine rotor includes a number of blades in each of a plurality of blade rows, the number of blades configured to operate at least some of the time at a rotational speed, and the number of blades and the rotational speed being such that the following formula holds true for at least one of the blade rows of the first turbine rotor, and does not hold true for any of the blade rows of the compressor rotor:

(number of blades×rotational speed)/60≥5500, and the rotational speed being an approach speed in revolutions per minute.

16. The gas turbine engine as set forth in claim 15, wherein the formula results in a number less than or equal to about 10000 for at least one of the blade rows of the first turbine rotor.

17. The gas turbine engine as set forth in claim 15, further comprising a low fan pressure ratio less than 1.45, wherein the low fan pressure ratio is measured across a fan blade alone, and wherein the first turbine includes a pressure ratio greater than about 5:1, the first turbine including an inlet having an inlet pressure, and an outlet that is prior to any exhaust nozzle and having an outlet pressure, and the pressure ratio of the first turbine being a ratio of the inlet pressure to the outlet pressure.

18. The gas turbine engine as set forth in claim 17, further comprising a second turbine, wherein the second turbine has two stages, and wherein the gear reduction has a gear reduction ratio of greater than about 2.5:1.

19. The gas turbine engine as set forth in claim 15, wherein the formula results in a number less than or equal to about 7000 for at least one of the blade rows of the first turbine rotor.

20. The gas turbine engine as set forth in claim 15, wherein the gas turbine engine is rated to produce 15,000 pounds of thrust or more, and wherein the fan has a fan tip speed less than about 1150 ft/second.

* * * * *